United States Patent [19]
Torbet

[11] Patent Number: 5,810,103
[45] Date of Patent: Sep. 22, 1998

[54] METHOD AND APPARATUS FOR MOUNTING PCD COMPACTS

[75] Inventor: Christopher J. Torbet, Chelsea, Mich.

[73] Assignee: Sylvan Engineering Company, Chelsea, Mich.

[21] Appl. No.: 758,792

[22] Filed: Dec. 3, 1996

[51] Int. Cl.$^6$ .................................................. E21C 13/00
[52] U.S. Cl. ........................ 175/413; 175/428; 175/434; 76/108.2
[58] Field of Search .............................. 299/103; 175/426, 175/428, 434, 413; 76/108.2, 108.4, DIG. 12

[56] References Cited

U.S. PATENT DOCUMENTS

| | | | |
|---|---|---|---|
| 2,631,360 | 3/1953 | Sanford et al. ....................... | 29/402.17 |
| 2,917,819 | 12/1959 | Britton et al. ....................... | 29/402.17 |
| 3,271,080 | 9/1966 | Gowanlock .............................. | 175/413 |
| 3,749,190 | 7/1973 | Shipman ................................ | 175/426 |
| 4,047,583 | 9/1977 | Dyer ..................................... | 175/426 |
| 4,466,498 | 8/1984 | Bardwell ................................ | 175/426 |
| 4,654,947 | 4/1987 | Davis ..................................... | 175/413 |
| 5,007,685 | 4/1991 | Beach et al. ........................... | 299/103 |

*Primary Examiner*—William P. Neuder
*Attorney, Agent, or Firm*—Young & Basile, P.C.

[57] ABSTRACT

A method and apparatus for improved attachment of a PCD compact, especially a two-layer disk-type PCD compact, to a tool or support surface with a mechanical connection. In general the PCD compact is provided with a blind bore in the substrate layer, the bore terminating in the substrate layer and opening onto an outer face of the substrate layer intended to engage or abut the tool or support surface. A mechanical fastener is inserted into the blind bore such that it is secured to the PCD compact to form an integral unit with a tool-engaging end of the fastener protruding from the compact. In a preferred form the mechanical fastener is a metal post having at least one, and alternately both, ends threaded for threaded engagement to both the blind bore (which would have its own threads) and suitable threaded openings on the tool.

15 Claims, 2 Drawing Sheets

METHOD AND APPARATUS FOR MOUNTING PCD COMPACTS

FIELD OF THE INVENTION

The present invention relates to ultra hard cutting elements known as PCD (polycrystalline diamond)-type compacts, and more particularly to the manner in which such compacts are mounted on cutting tools or other support surfaces.

BACKGROUND OF THE INVENTION

PCD compacts are used as small cutting elements in various shapes, often disks, consisting of a stiff substrate with a (preferably) high modulus of elasticity such as cemented carbide. This preferably stiff substrate supports an ultra-hard cutting layer typically containing diamond or CBN (cubic boron nitride) and possibly other materials such as sintering aids and secondary abrasives. The ultra-hard layer is used as the wear resistant cutting surface, and is typically found on the cutting faces of rock drills and other industrial cutting tools required to cut or drill through hard, abrasive materials.

While the above description of a PCD compact is representative of commercially available compacts, the composition of the substrate/ultra hard layer compact can vary in a manner known to those skilled in the art. For example, a substrate may comprise something other than carbide-type materials when used in applications that do not demand high loading conditions. The ultra-hard layer may comprise multiple layers of different composition, or a layer which varies from one side to the other, and may be flat or curved. These and other known variations will be apparent to those skilled in the art.

The commercially available geometry and extreme hardness of PCD compacts renders them difficult to attach and replace as cutting elements on cutting tools such as rock drills. Prior art methods of attachment typically involve brazing the substrate onto the tool face, but there are several problems inherent in the brazing method of attachment. The part onto which the PCD is being brazed needs to be heated with special equipment; brazing skill, like welding skill, is variable among operators; certain tools and environments do not tolerate the heat involved in the brazing process; brazing can cause thermal damage to the PCD compact itself; and, brazed PCD compacts are difficult to replace or repair.

There have been attempts to improve the manner in which hard cutting elements are attached to cutting tools. For example, U.S. Pat. No. 4,694,918 to Hall discloses a PCD compact having a cylindrical portion sized for a press-fit into a drill bit or similar tool surface. The compacts are embedded in the bit by press-fitting or brazing them into the head of the bit.

U.S. Pat. No. 4,057,884 to Suzuki discloses a tool holder in which a cemented carbide type cutting bit has a hole formed through it for attachment to a tool with a bolt mechanism. The Suzuki attachment structure is designed for a compact with uniform (non-ultra hard) material having an angular, lateral cutting edge, rather than a PCD type compact with an ultra-hard cutting face.

U.S. Pat. Nos. 3,136,615 and 3,141,746 mention without explanation the use of "mechanical joints" to secure a cutting compact to a tool, for example: "mechanical joints also may be employed in the compact oriented in holder 27 in various arrangements depending on compact configuration" (column 4, lines 64–66 of U.S. Pat. No. 3,141,746).

Also: "The compact is attached to some support in various position by soldering or brazing, for example, a titanium hydride soldering process as given in U.S. Pat. No. 2,570,428, Kelley, or by mechanical attaching means, or by having the tool or adjacent metal be forced into the surface irregularities of the compact" (column 6, lines 17–23 of U.S. Pat. No. 3,141,746).

U.S. Pat. No. 4,199,035 to Thompson discloses a threaded attachment system for mounting a stud- or pin-shaped PCD compact on a drill bit by way of an external threaded sleeve mating with a threaded bushing in the drill bit. The sleeve holds the compact in place in an interference-type fit as it is threaded down into the tool-mounted bushing over the compact. This patent additionally discloses a metal locating pin mounted on the tool to slide fit into a recess in the lower surface of the stud toward the edge of the stud to locate the stud at the proper rotational angle for cutting.

The above-described prior art has not fully satisfied the need for a simple, efficient method for attaching PCD compacts to a tool or other support surface. The invention described below solves this problem.

SUMMARY OF THE INVENTION

The present invention is an improved mounting arrangement for a PCD compact, and in general takes the form of a blind bore formed in the relatively softer substrate of the PCD compact, terminating in the substrate, the blind bore receiving a mechanical fastening element therein to secure the fastening element to the compact. The mechanical fastening element is designed to be easily attached to a tool. In a preferred form the mechanical fastener is a threaded post protruding from the substrate side of the PCD compact to facilitate easy mounting and replacement of the compact on a tool face or support surface.

In a preferred form the blind bore terminates in the substrate abutting the ultrahard layer to make full use of the substrate depth.

In an alternate embodiment, the blind bore is formed with an internal thread to accept a mechanical fastener in threaded engagement.

DETAILED DESCRIPTION OF THE DRAWINGS

Figure 1:
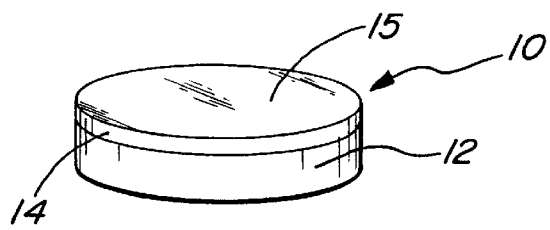
FIG. 1 is a perspective front view of a prior art PCD compact.

FIG. 1 illustrates a typical disk-shaped PCD compact 10 comprising a lower substrate layer 12 and an ultra-hard upper layer 14. In the illustrated embodiment the substrate layer 12 is formed from conventional cemented carbide material with a high modulus of elasticity to provide a very stiff body to support the ultra-hard layer 14. The ultra hard layer 14, in turn, is formed from a conventional cemented or sintered diamond or CBN particulate, and is significantly harder than the substrate to provide a durable cutting surface.

Figure 9:
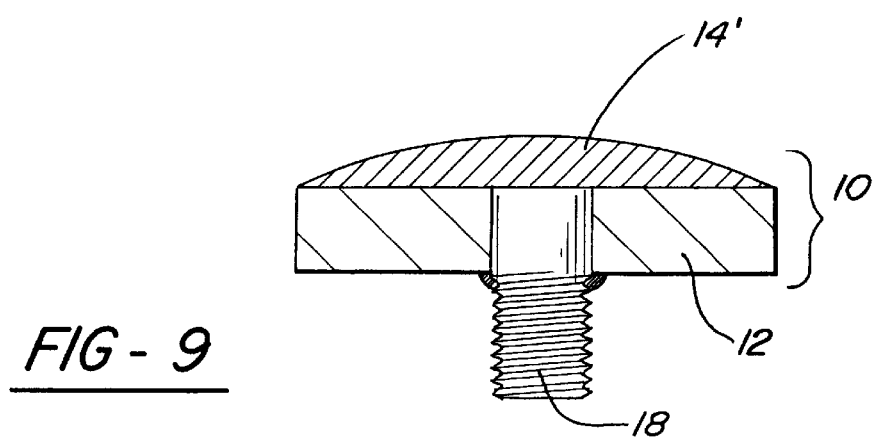

Although the PCD compact 10 in FIG. 1 is illustrated with a flat upper surface 15, it will be apparent to those skilled in the art that curved or domed-shaped upper surfaces are available, for example as illustrated in FIG. 9.

Figure 2:
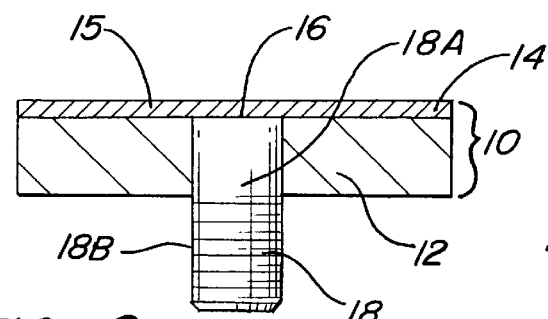
FIG. 2 is a side section view of a PCD compact with an improved mounting arrangement according to the present invention.

FIG. 2 illustrates the conventional PCD compact 10 of FIG. 1, modified according to the present invention so that it can be easily and inexpensively secured to a cutting tool or other support surface without the need for brazing or other complicated prior art techniques. A blind bore 16 is formed in substrate 12 opposite ultra-hard layer 14, blind bore 16 opening onto the lower surface 12a of the substrate. Blind bore 16 terminates in substrate 12 at ultra-hard layer 14. In the illustrated embodiment blind bore 16 is a cylindrical bore, although other geometries such as triangular, rectangular, and tapered bores are possible. Blind bore 16 may also terminate in the substrate below ultrahard layer 14, i.e. with substrate between the end of the bore and the ultrahard layer.

Blind bore 16 receives a mechanical fastener 18 permanently secured to the PCD compact under normal working conditions. In the illustrated embodiment the mechanical fastener 18 is a metal post with an insert end 18a secured in the blind bore, and a threaded tool engaging end 18b protruding from the PCD compact for attachment to a tool or support surface. Blind bore 16 is preferably formed in the rotational center of the PCD compact for ease in threading post 18 into an aperture on a tool or support surface.

Once secured in PCD compact 10, post 18 and PCD compact 10 form a solid, integral unit carrying its own mechanical fastening structure for simple, fast attachment or removal from a tool. This is a significant improvement over the prior art brazing and mechanical attachment methods, since it requires no external apparatus or fastening structure; PCD compact 10 and post 18 can simply be threaded onto a tool as a self-contained unit.

The invention is also an improvement over the prior art attachment methods which require drilling a hole completely through a cutting element. The ultra-hard layer 14 on PCD compact 10 does not lend itself to having a hole or bore formed therethrough, in part due to its hardness, and such a bore would both damage its structural integrity and leave the relatively soft mechanical fastener portion exposed on the upper cutting face 15, where it would quickly be degraded.

The invention is also an improvement over structures such as that shown in the Thompson patent described above. Thompson requires separate threaded insert sleeves and bushings which fit over the PCD compact, suitable only for elongated, pin or stud-shaped PCD compacts. The exposed portions of Thompson's bushings would quickly erode under normal operating conditions, whereas the substrate-mounted fastener 18 on the tool-engaging side of the present inventive compact is protected. The present invention also does not require anti-rotation or locating structure such as that needed for Thompson's externally threaded sleeve fitted over the sides of the compact.

Figure 3:
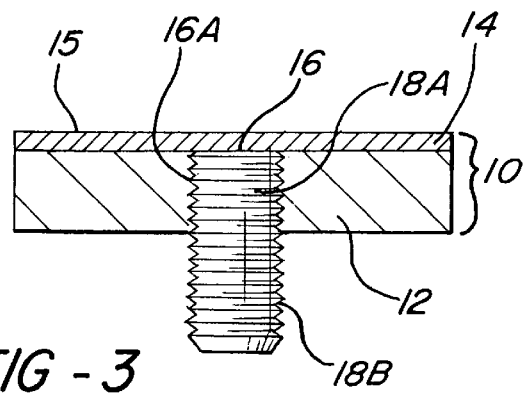
FIG. 3 is a side section view of an alternate mounting arrangement according to the invention.

Referring now to FIG. 3, an alternate embodiment of the invention is shown in which the fastener post is threaded at both ends 18a, 18b so that it can be threadably attached to the PCD compact before attaching the integral unit to a tool. In this embodiment blind bore 16 is provided with internal threads 16a to accept the threaded insert end 18a of the post 18.

Figure 4:
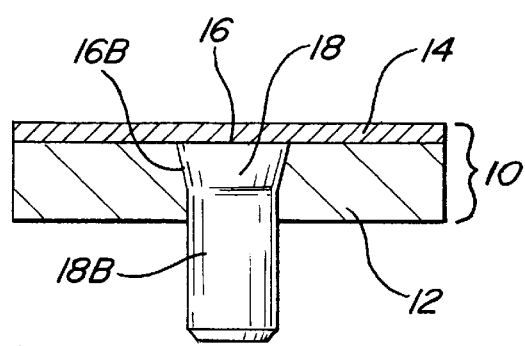
FIG. 4 is yet another embodiment of a mounting arrangement for a PCD compact according to the present invention.

Referring now to FIG. 4, yet a further embodiment is illustrated in which blind bore 16 is formed with at least a portion tapered in cross-section, and fastener post 18 is secured to the PCD compact 10 in a swage-fit in which its insert end 18a is deformed to fill the tapered region 16b of blind bore 16 such that it cannot be removed.

Figure 5:
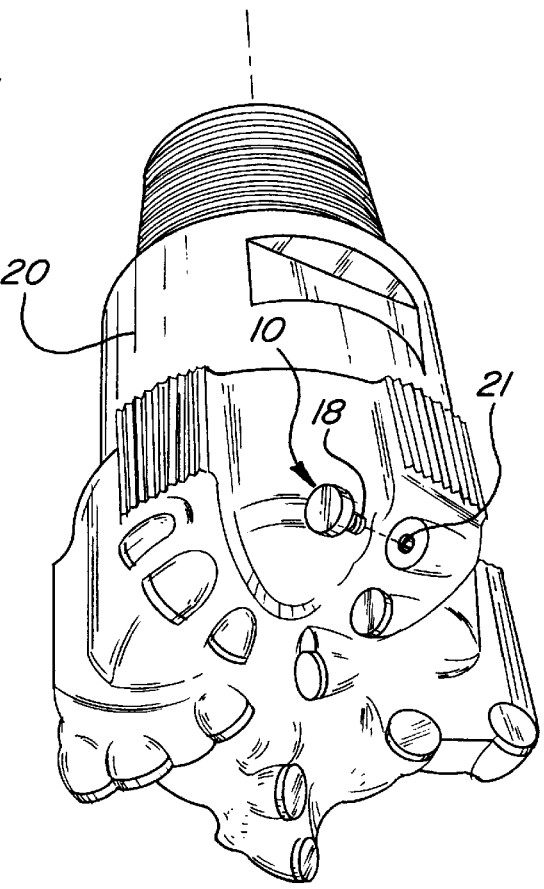
FIG. 5 illustrates a typical tool on which a PCD compact according to the present invention would be employed.

Referring now to FIG. 5, a typical compact-supporting surface, here a rock drill bit tool, is illustrated schematically with a plurality of mechanically-mounted PCD compacts according to the embodiments of the invention in FIGS. 2 and 3 which can be attached to its cutting surfaces. FIG. 5 illustrates the manner in which threaded PCD compacts 10 can be threaded into mating apertures 21 formed in the tool to install compacts 10. The direction of rotation of the threaded coupling between the PCD compact 10 and tool 20 can be set to complement the direction of rotation of the drill bit or tool so that the PCD compacts are not loosened by the cutting action of the tool. Additionally, it is possible to supplement the threaded connection between compacts 10 and apertures 21 with known techniques such as thread-locking adhesives or washers.

It will be understood by those skilled in the art that the blind bore 16 in the PCD compact substrate can be formed in situ as part of the original manufacturing process for the PCD compact. Alternately it can be formed afterwards using known methods such as ultrasonic abrasive machining, abrasive jet machining, grinding, electrical discharge machining, laser, or electrochemical machining.

It will also be understood by those skilled in the art that the configuration of the blind bore 16 in substrate 12 can take forms other than the cylindrical bore illustrated in FIGS. 2–4. For example, it can be a straight bore with either a smooth or rough finish; it can be a tapered bore; it can have a barbed internal surface to assist in swage- or interference-fits; or, as described above, it may be a bore with an internal thread.

Securing the mechanical fastener 18 to PCD compact 10 in blind bore 16 can be done mechanically, for example by the above-described threaded connection, or by swaging or upsetting; thermally, for example by brazing or welding as shown in FIG. 2; or, chemically using an adhesive (FIG. 2).

The present invention is suitable for application in grinding, crushing, and milling equipment. This type of equipment is widely used by many industries for comminution of ores and various hard, crushable materials. The invention lends itself to being incorporated easily into existing equipment to strategically place an ultrahard wear resistant element at a location that is most prone to wear. The benefits of using the invention as described are several-fold. The useful life of equipment would be extended which means improved consistency and less downtime. The wear elements are field replaceable which reduces maintenance time. Also, the ultra-high modulus property of the wear elements lends itself to providing an energy savings for a crushing application.

Figure 6:
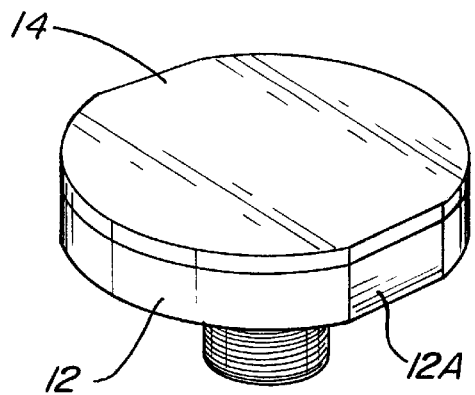
FIGS. 6 and 7 are alternate embodiments of the inventive compact illustrated in FIGS. 2–5, including external assembly-assisting surfaces formed in the compact.
Figure 7:
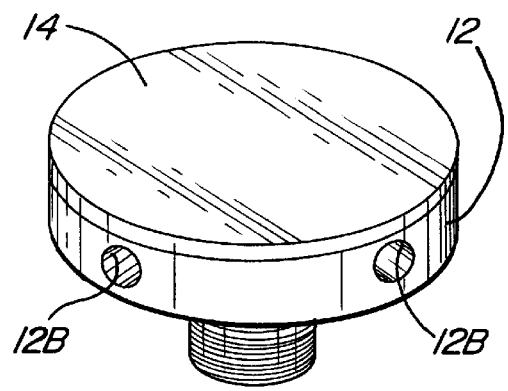

FIGS. 6 and 7 illustrate the formation of tool-receiving surfaces on PCD compact 10 to assist in assembling the threaded post versions of the invention to the desired surface. FIG. 6 illustrates wrench flats 12a formed on the external surface of the compact. The compact in FIG. 7 is provided with spanner wrench holes. Other tool-receiving surfaces are possible to accommodate known tools.

Figure 8:
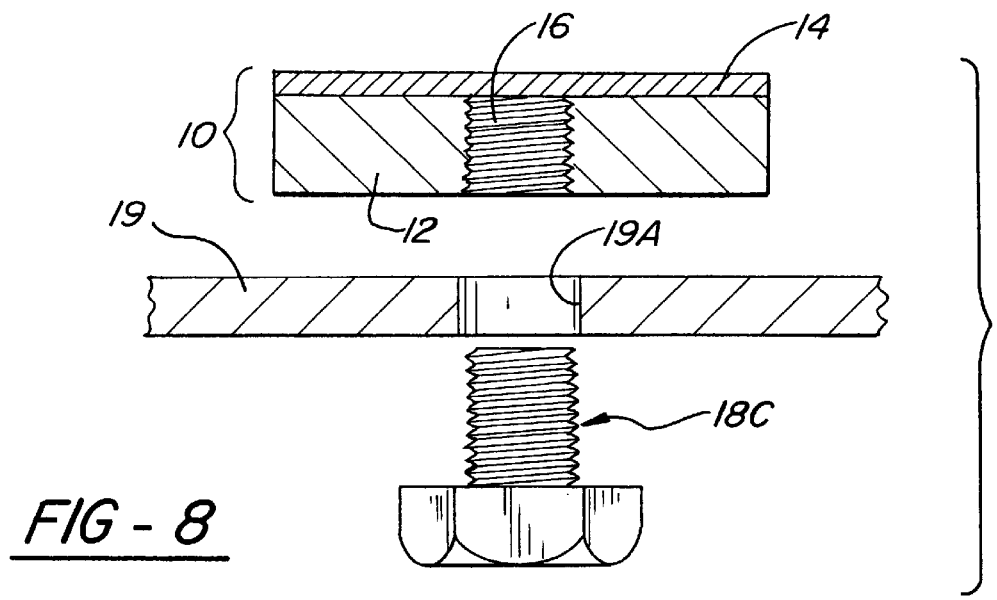
FIG. 8 illustrates a further embodiment in which the mounting structure is separated from the compact to mount the compact to a tool; and, FIG. 9 illustrates the improved mounting arrangement of the present invention used with a PCD having a different surface geometry.

FIG. 8 illustrates yet a further embodiment in which mounting post 18c (preferably threaded) is separated from PCD compact 10 for assembly of the compact to a tool surface 19, inserted through hole 19a provided for that purpose, and subsequently reassembled to bore 16. In this manner the mounting post can be conveniently stored with the PCD compact in an assembled state, if desired.

FIG. 9 illustrates another embodiment which shows a PCD compact 10 with non-planar ultra-hard upper layer 14 and a non-planar upper surface of the substrate 12.

Through-hole mounting would be most suitable for attaching the PCD to a tool of relatively thin cross section, such as a cutting blade. In through-hole mounting applications having the PCD compact separate from the threaded post provides added versatility in mounting. The tool that the PCD is mounted to may have a through-hole of any depth. The depth is accommodated simply by selecting a fastener of the proper length. In this manner, it is only necessary to inventory relatively inexpensive fasteners of varying shank length rather than PCD compacts with varying post lengths.

The present improvement over prior art techniques for attaching compacts not only simplifies attachment to traditional cutting tools, but opens up possibilities for using compacts on non-traditional surfaces, whenever ultra-hard cutting elements or ultra-hard wear resistant surfaces are desired.

It will therefore be understood by those skilled in the art that the foregoing illustrative embodiments of my invention are exemplary in nature, and are not intended to limit the invention beyond the scope of the following claims.

I accordingly claim:

1. An improved PCD type compact having self-contained means for attaching the compact in secure fashion to a tool or support surface, comprising:

a PCD compact having a substrate layer and an ultra-hard layer formed from a material having a hardness greater than that of the substrate layer, the substrate layer having a mounting face defining a tool-engaging surface of the PCD compact, and the ultra-hard layer having a face defining an outer cutting or wear resistant surface of the PCD compact;

a blind bore formed in the mounting face of the substrate layer, the blind bore terminating in the substrate layer;

mechanical fastener means inserted in and secured to the blind bore so as to make it an integral part of the PCD compact, the fastener means further including a tool-engaging end protruding from the open face of the PCD compact for mechanically securing the compact to a tool or support surface.

2. The apparatus of claim 1, wherein the fastener means comprises a post.

3. The apparatus of claim 2, wherein the tool-engaging end of the post is threaded to threadably engage a mating threaded aperture on a tool or support surface.

4. The apparatus of claim 3, wherein the blind bore and the end of the post inserted into and secured to the blind bore are matingly threaded such that the post can be threaded into the blind bore to secure the post to the PCD compact.

5. The apparatus of claim 1, wherein the PCD compact is disk-shaped, with a lower substrate layer defining a bottom tool-engaging surface and an upper ultra-hard layer defining an upper cutting surface, the blind bore being formed centrally in the bottom tool-engaging surface.

6. The apparatus of claim 1, wherein the fastener means is permanently attached to the PCD compact.

7. The apparatus of claim 1, wherein the fastener means is removably attached to the PCD compact.

8. The apparatus of claim 1, wherein the PCD compact includes a tool-receiving surface for enabling an assembly tool to engage the compact to secure the fastener means to the tool or support surface.

9. The apparatus of claim 1, wherein the blind bore terminates in the substrate layer at the ultra-hard layer.

10. The apparatus of claim 1, wherein the blind bore terminates in the substrate layer below the ultra-hard layer.

11. A method for forming a PCD compact such that it can be mechanically secured to a tool or support surface, comprising the following steps:

forming a blind bore in an open face of a substrate layer of the PCD compact, the blind bore terminating in the substrate layer up to an ultra-hard layer defining a cutting or wear resistant surface;

inserting a mechanical fastener into the blind bore and securing the mechanical fastener to the PCD compact via a connection with the blind bore such that the mechanical fastener and the PCD compact become an integral unit with a tool-engaging end of the mechanical fastener protruding from the open face of the substrate layer of the PCD compact; and, providing the tool-engaging end of the mechanical fastener with means for mechanically attaching the PCD compact to a tool or support surface.

12. The method of claim 11, further including the step of threading the end of the tool-engaging end of the mechanical fastener so that it can be threadably engaged with a mating threaded aperture on the tool.

13. An improved PCD type compact capable of being mechanically fastened in secure fashion to a tool or support surface, comprising:

a PCD compact having a substrate layer and an ultra-hard layer formed from a material having a hardness greater than that of the substrate layer, the substrate layer having a mounting face defining a tool-engaging surface of the PCD compact, and the ultra-hard layer having a face defining an outer cutting or wear resistant surface of the PCD compact;

a blind bore formed in the mounting face of the substrate layer, the blind bore terminating in the substrate layer, the blind bore being formed to receive therein a mechanical fastener means in a manner making the mechanical fastener means an integral part of the PCD compact capable of securing the compact to the tool or support surface.

14. The apparatus of claim 13, wherein the blind bore terminates in the substrate layer at the ultra-hard layer.

15. The apparatus of claim 13, wherein the blind bore terminates in the substrate layer below the ultra-hard layer.

* * * * *

UNITED STATES PATENT AND TRADEMARK OFFICE
CERTIFICATE OF CORRECTION

PATENT NO : 5,810,103
DATED : September 22, 1998
INVENTOR(S): Christopher J. Torbet It is certified that error appears in the above-identified patent and that said Letters Patent is hereby corrected as shown below:

Column 3, line 38, after "attachment" insert --to--.

Column 4, line 66, after "spanner wrench holes" insert --12b--.

Column 5, line 10, change "non-planar upper surface" to --planar upper surface--.

Column 5, line 11, after "through-hole mounting" insert --as shown in Figure 8--.

Column 5, line 12, replace "the PCD" with --a PCD compact according to the invention--.

Column 5, line 14, after "applications" insert --,--.

Signed and Sealed this

Twenty-third Day of March, 1999

Attest:

Q. TODD DICKINSON

Attesting Officer        Acting Commissioner of Patents and Trademarks